(12) United States Patent
Mercier et al.

(10) Patent No.: US 7,628,357 B2
(45) Date of Patent: Dec. 8, 2009

(54) AIRCRAFT SAFETY SEAT

(75) Inventors: Bertrand Mercier, Issoudun (FR); Etienne Luneau, St. Lizaigne (FR)

(73) Assignee: Societe Industrielle et Commericale de Materiel Aeronautique Sicma Aero Seat

( * ) Notice: Subject to any disclaimer, the term of this patent is extended or adjusted under 35 U.S.C. 154(b) by 326 days.

(21) Appl. No.: 11/415,285

(22) Filed: May 2, 2006

(65) Prior Publication Data

US 2007/0029444 A1 Feb. 8, 2007

(30) Foreign Application Priority Data

May 3, 2005 (FR) .................................. 05 04499

(51) Int. Cl.
*B64D 25/04* (2006.01)
(52) U.S. Cl. .............................. 244/122 R; 297/216.1; 297/216.17
(58) Field of Classification Search .............. 244/118.5, 244/118.6, 122 R; 297/216.1, 216.11, 216.12, 297/216.13, 216.14, 216.15, 216.16, 216.17, 297/216.18, 216.19, 216.2
See application file for complete search history.

(56) References Cited

U.S. PATENT DOCUMENTS

| | | | | |
|---|---|---|---|---|
| 2,669,284 | A * | 2/1954 | Pall et. al. ............... | 297/344.14 |
| 3,059,966 | A * | 10/1962 | Spielman ............... | 297/216.17 |
| 3,532,379 | A * | 10/1970 | Gonsalves, Jr. et. al. ................ | 297/216.17 |
| 3,861,637 | A * | 1/1975 | DeLongchamp ............ | 248/576 |
| 3,985,388 | A * | 10/1976 | Hogan .................... | 297/216.17 |
| 4,150,805 | A | 4/1979 | Mazelsky | |
| 4,358,154 | A * | 11/1982 | Campbell ............... | 297/216.17 |
| 4,408,738 | A * | 10/1983 | Mazelsky ............... | 244/122 R |
| 4,423,848 | A * | 1/1984 | Mazelsky ............... | 244/122 R |
| 4,523,730 | A * | 6/1985 | Martin .................... | 244/122 R |
| 4,525,010 | A * | 6/1985 | Trickey et al. ......... | 297/216.17 |
| 4,655,416 | A * | 4/1987 | Carnell et al. ............... | 244/121 |
| 5,176,356 | A * | 1/1993 | Lorbiecki et al. ........... | 248/577 |
| 5,273,240 | A * | 12/1993 | Sharon .................... | 244/122 R |
| 5,558,301 | A * | 9/1996 | Kerdoncuff et al. ..... | 244/122 R |
| 5,657,950 | A * | 8/1997 | Han et al. ............... | 244/122 R |
| 5,676,336 | A * | 10/1997 | Nefy et al. ............... | 244/122 R |
| 5,692,705 | A | 12/1997 | Bellais | |
| 6,237,889 | B1 | 5/2001 | Bischoff | |
| 6,378,939 | B1 * | 4/2002 | Knoll et al. ............... | 297/216.1 |
| 2004/0169405 | A1 * | 9/2004 | Stinnes .................... | 297/216.1 |

FOREIGN PATENT DOCUMENTS

FR 2389045 11/1978
GB 998535 7/1965

OTHER PUBLICATIONS

French Search Report dated Dec. 7, 2005.

* cited by examiner

*Primary Examiner*—Benjamin P Lee
(74) *Attorney, Agent, or Firm*—Blank Rome LLP

(57) ABSTRACT

An aircraft safety seat that has a supporting structure and a bucket seat supported by the structure, the bucket seat has a seat and a back which are lined together, the back being installed on the structure so as to slide generally downwards, wherein at least one connection rod connected by its first end to the support and by its other end to the seat, the connecting rod being generally horizontal when in normal use, and being suited for pivoting downwards by its first end under the effect of a force exerted downwards on the seat, against the action of a shock absorber.

10 Claims, 8 Drawing Sheets

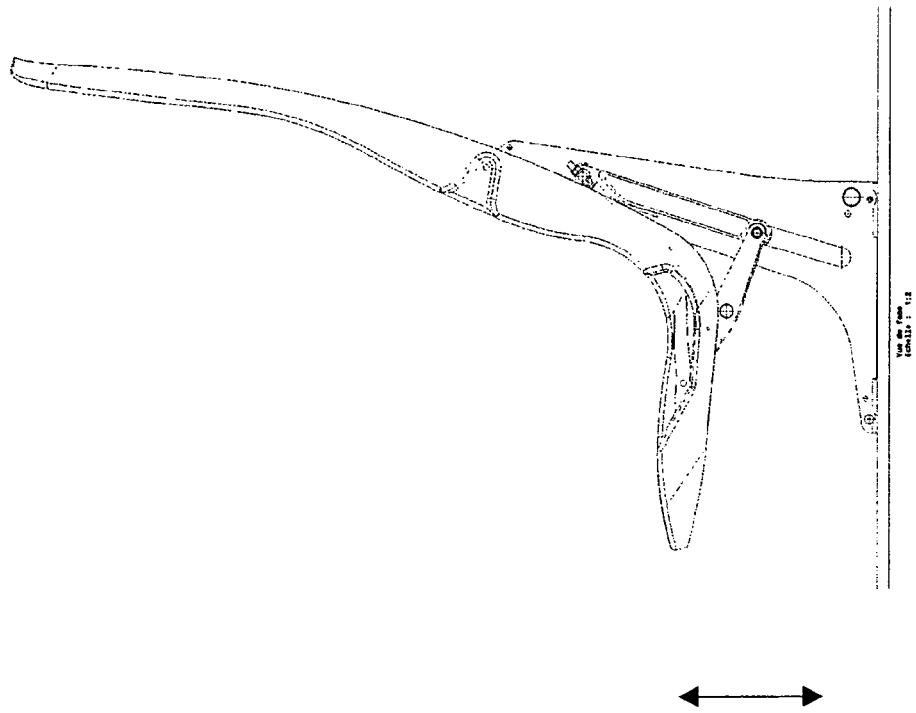
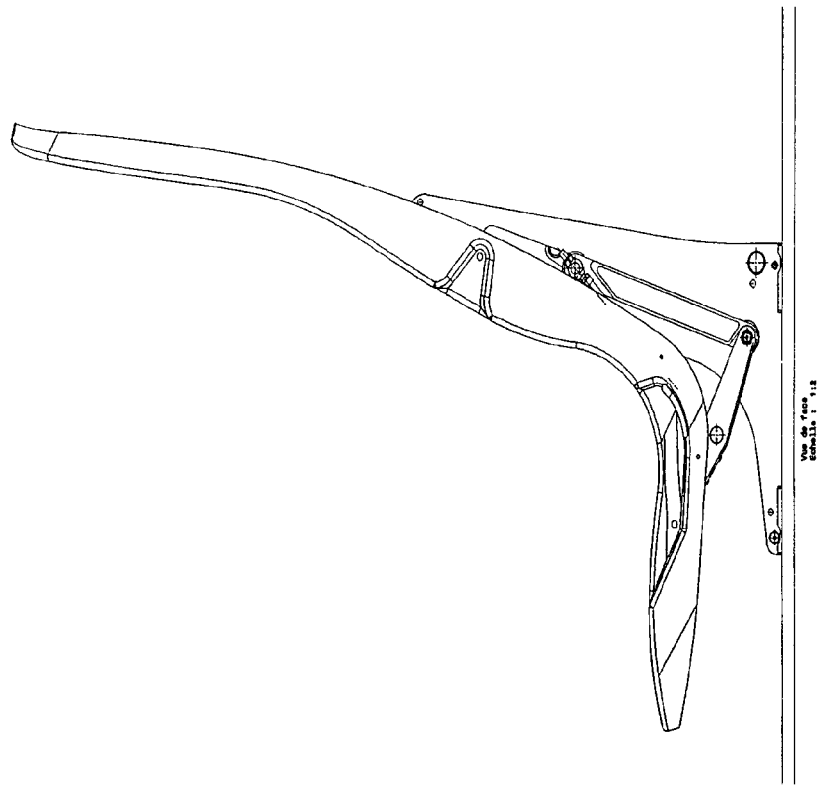
Fig. 7

AIRCRAFT SAFETY SEAT

RELATED APPLICATION

This application claims priority to French Patent Application No. FR 0504499, filed May 3, 2005, the subject matter of which is herein incorporated by reference.

FIELD OF THE INVENTION

This invention relates to an aircraft safety seat and, more particularly, to such a seat comprising a supporting structure and a bucket seat supported by said structure, said bucket seat comprising a seat and a back that are linked together, said back being installed on said structure so as to slide generally downwards.

BACKGROUND OF THE INVENTION

Such seats are known from document U.S. Pat. No. 5,842,669. This document describes an "anti-crash" seat, in other words, a seat that can absorb the kinetic energy of the occupant in cases of intense vertical acceleration, by deformation of a shock absorber. Thus, the impact suffered by the occupant remains lower than an acceptable value for an acceleration with a predetermined value.

In the aforementioned document, the shock absorber consists of the part of the structure on which the back slides. This solution, however, has the disadvantage of the structure itself being destroyed during the crash and needing to be replaced.

SUMMARY OF THE INVENTION

This invention aims to solve this disadvantage.

More particularly, the invention aims to provide a safety seat in which a minimum number of elements are destroyed in the event of an accident.

For this purpose, the invention relates first of all to an aircraft safety seat comprising a support structure and a bucket seat supported by said structure, said bucket seat comprising a seat and a back linked together, said back being installed on said structure so as to slide generally downwards, characterised in the fact that it comprises at least one connecting rod connected by its first end to said support and by its other end to said seat, said connecting rod being generally horizontal when in normal use, and being able to pivot downwards by its first end under the effect of stress exerted in a downward direction on said seat, against the action of a shock absorber.

Thus, in the event of an accident, only the shock absorber needs to be replaced, since the structure of the seat is not damaged.

Said back is preferably installed so as to slide on said supporting structure by means of at least one annular linear element placed between the supporting structure and said back.

The shock absorber can be of any suitable type. It can, for example, absorb the energy by permanent distortion with rotation of the mobile joint of the connecting rod on the structure.

However, in a specific embodiment of the invention, said shock absorber is a linear shock absorber, the first end of which is fixed to said supporting structure, with the other end fixed to said connecting rod.

More particularly, said linear shock absorber can be a traction system in which the first end is fixed to said supporting structure above the point of connection of said connecting rod.

Also in a specific embodiment of the invention, said supporting structure comprises a fixed part and a mobile part, said mobile part being installed in an adjustable sliding fashion, generally vertically, on said fixed part, said connecting rod being connected by its first end to said mobile part.

This allows the height of the seat to be adjusted.

More particularly, said bucket seat and said mobile part may be installed so as to slide on said fixed part, substantially in the same direction.

It is also possible to use a single connecting rod, installed for example under the seat of the bucket seat.

However, in a specific embodiment of the invention, the seat according to the invention comprises two lateral connecting rods, each of which is connected to one of the sides of said seat.

A seatbelt attachment point may be installed on the connection to the supporting structure of at least one of said lateral connecting rods.

In another embodiment of the invention, an attachment point for the seatbelt is installed on said bucket seat, said attachment point being connected by another connecting rod to the supporting structure of at least one of said lateral connecting rods, said other connecting rod being arranged so as to deform in the event of a crash.

Thus, the connecting rod absorbs the stress from the seatbelt, except in the event of a crash, when the shock absorber comes into action.

In a specific embodiment of the invention, the assembly consisting of the supporting structure, the bucket seat and the shock absorber is prestressed during its assembly.

The prestressing can be obtained, for example, by means of screw-nut interfaces on at least one of the ends of the absorber.

According to different variants, the seat also comprises one or several lap, sash or crotch-strap seatbelts, fixed at attachment points on the supporting structure or on the bucket seat.

The invention also relates to an aircraft comprising at least one of the seats such as described above.

BRIEF DESCRIPTION OF THE DETAILED EMBODIMENTS

The following is a non-exhaustive description of a specific embodiment of the invention, made in reference to the appended schematic drawings, in which:

FIG. 7 is a side view of a seat according to the invention in a specific embodiment of the invention in which the height of the bucket seat can be adjusted;

DETAILED DESCRIPTION OF THE PREFERRED EMBODIMENTS

Figure 1:
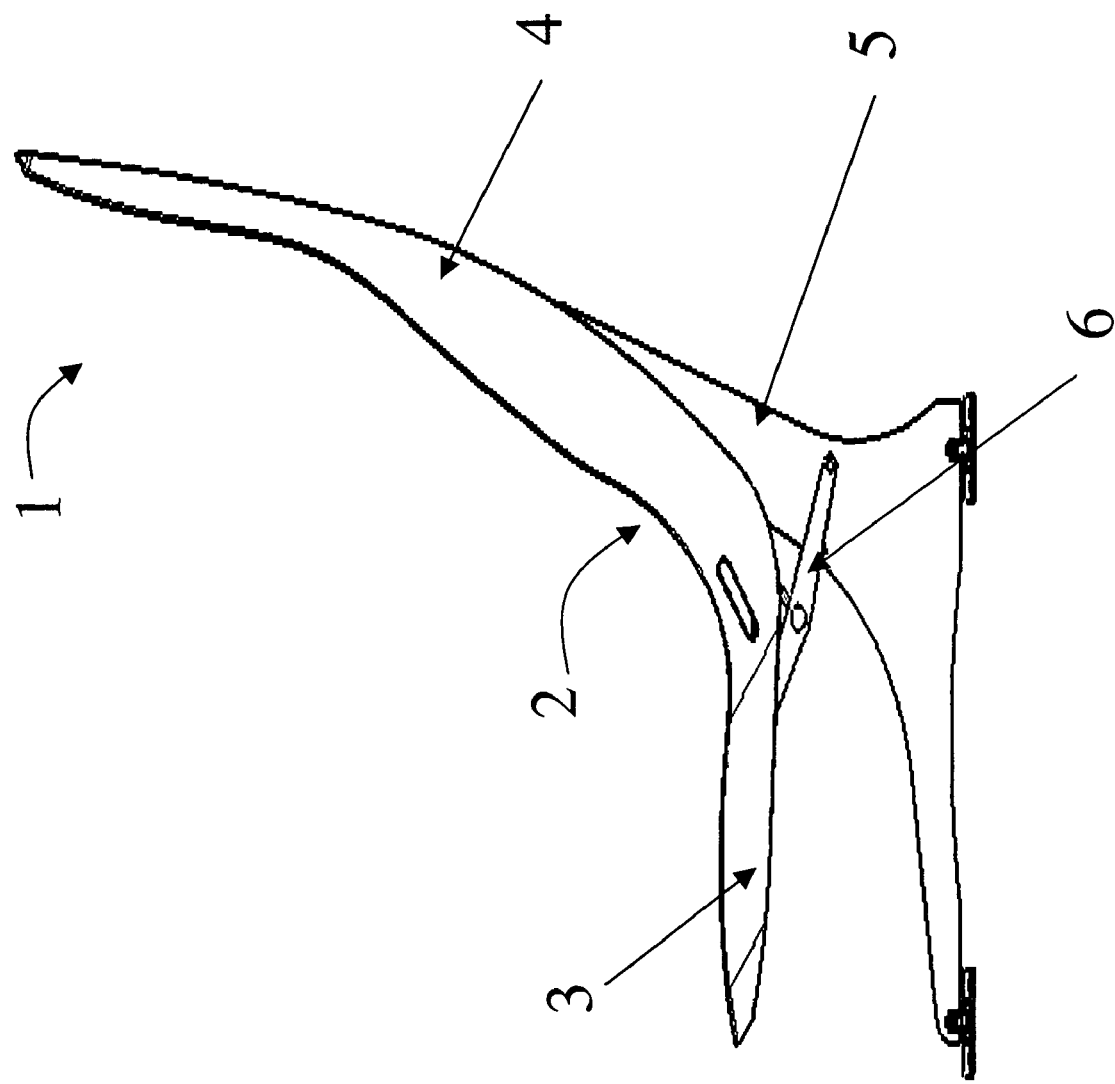
FIG. 1 is a side view of a seat according to the invention in flight position.

FIGS. 1 to 8 describe an aircraft safety seat 1. In a known fashion, such a seat comprises a bucket seat 2 comprising a seat 3 and a back 4, linked together. The bucket seat 2 is supported by a supporting structure 5.

This supporting structure 5 consists, for example, of two manufactured uprights, which are fixed in relation to the interfaces of the vehicle in which the seat according to the invention is installed, two tubular crosspieces connecting the two uprights to each other, and interfaces with the floor of the vehicle.

Figure 3:
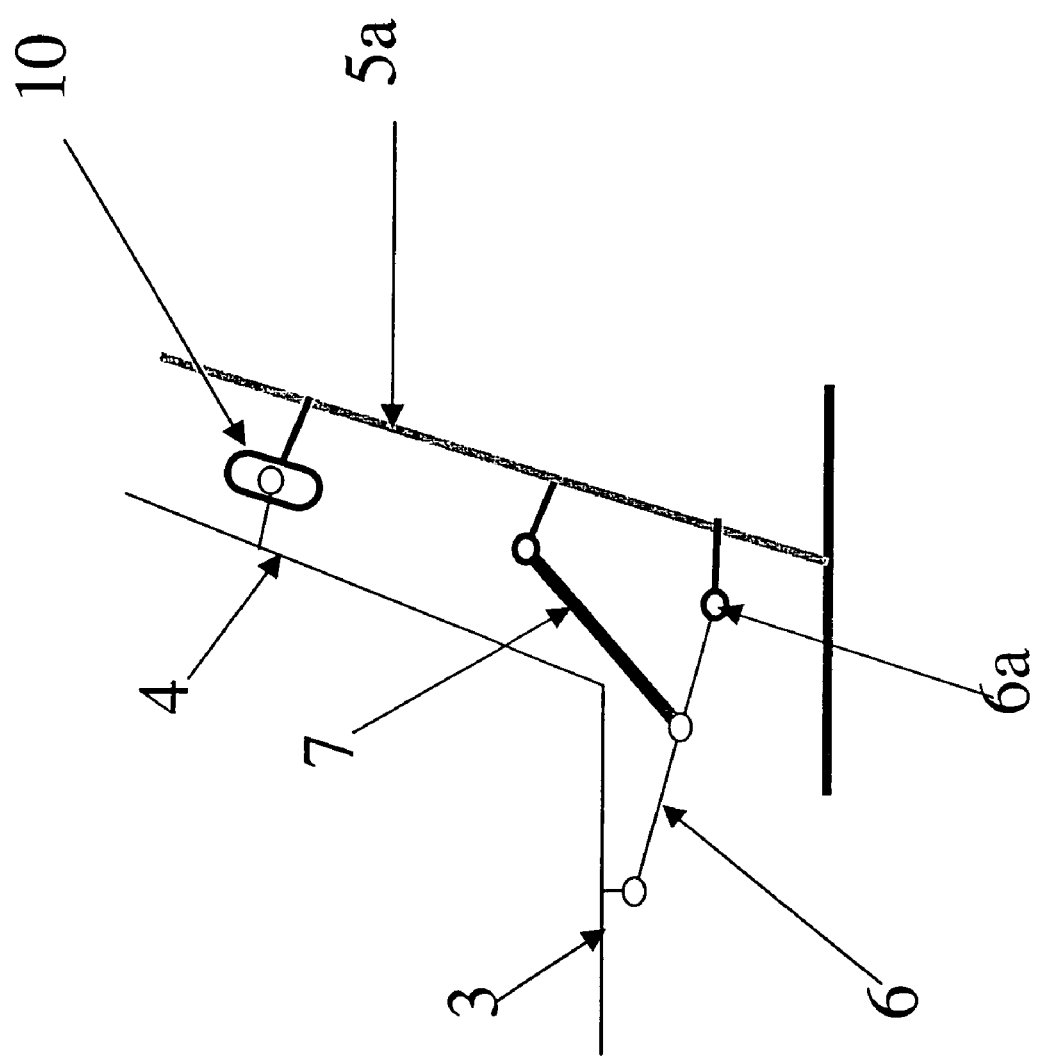
FIG. 3 is a schematic side view of the anti-crash seat according to the invention.

As shown schematically in FIG. 3, the bucket seat is installed so as to slide in relation to the supporting structure 5 by means of one or several annular linear elements 10 positioned between the uprights of the structure 5 and the back 4. When the structure 5 comprises two fixed manufactured uprights, two annular linear elements are preferably positioned between the bucket seat and the uprights, one per upright, by means of an axle fixed to the bucket seat which passes through an oblong space between the uprights.

According to the invention, the seat also comprises at least one connecting rod 6 connected by a pivoting link on its first end 6a to the supporting structure 5, and on its second end 6b to the seat 3. According to an alternative embodiment, the link that connects the connecting rod at the ends can also be a ball-and-socket joint.

The position and the number of connecting rods used can vary according to the invention. Preferably, two lateral connecting rods are used, each connected to one of the sides of the seat 3, but it is also possible to use a single connecting rod, for instance installed under the seat 3 of the bucket seat 2.

The connecting rod 6 can pivot around the connection at the height of its end 6a that is fixed to the supporting structure 5. By means of such pivoting, the seat 1 according to the invention then moves from a high position to a low position as shown in FIG. 4, the connecting rod 6 moving from its substantially horizontal position by pivoting, which allows the bucket seat 2 to move.

Figure 2:
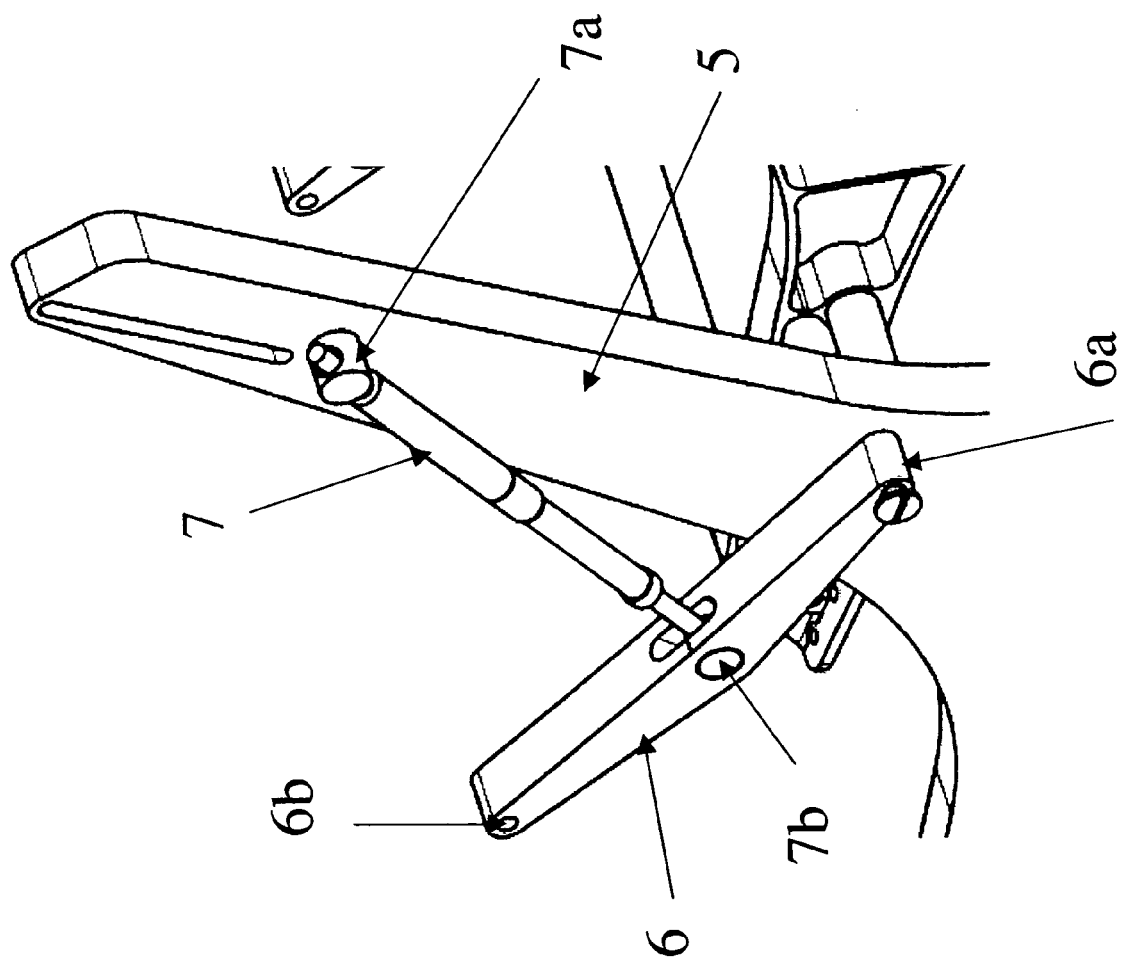
FIG. 2 is a larger-scale view of the supporting structure bearing the bucket seat of the seat according to the invention in flight position.

As shown in greater detail in FIG. 2, the seat 1 according to the invention also comprises at least one shock absorber 7 in which a first end 7a is connected to the supporting structure 5, and a second end 7b is connected to the connecting rod 6.

The links at the height of the ends of the shock absorber are, in general terms, pivoting links, but they can also be ball-and-socket joints.

Figure 4:
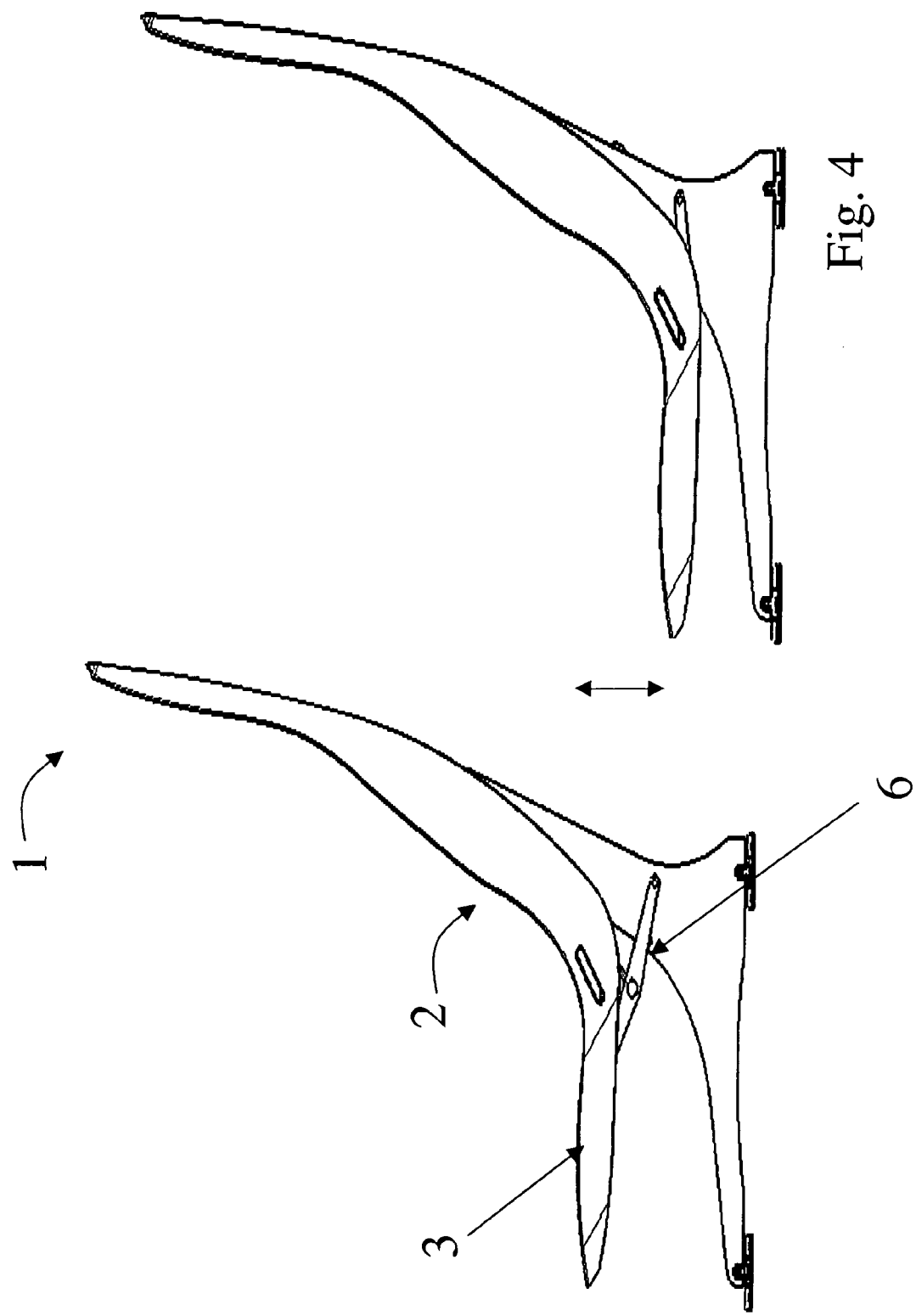
FIG. 4 is a side view of the seat according to the invention before and after absorption following a crash.
Figure 5:
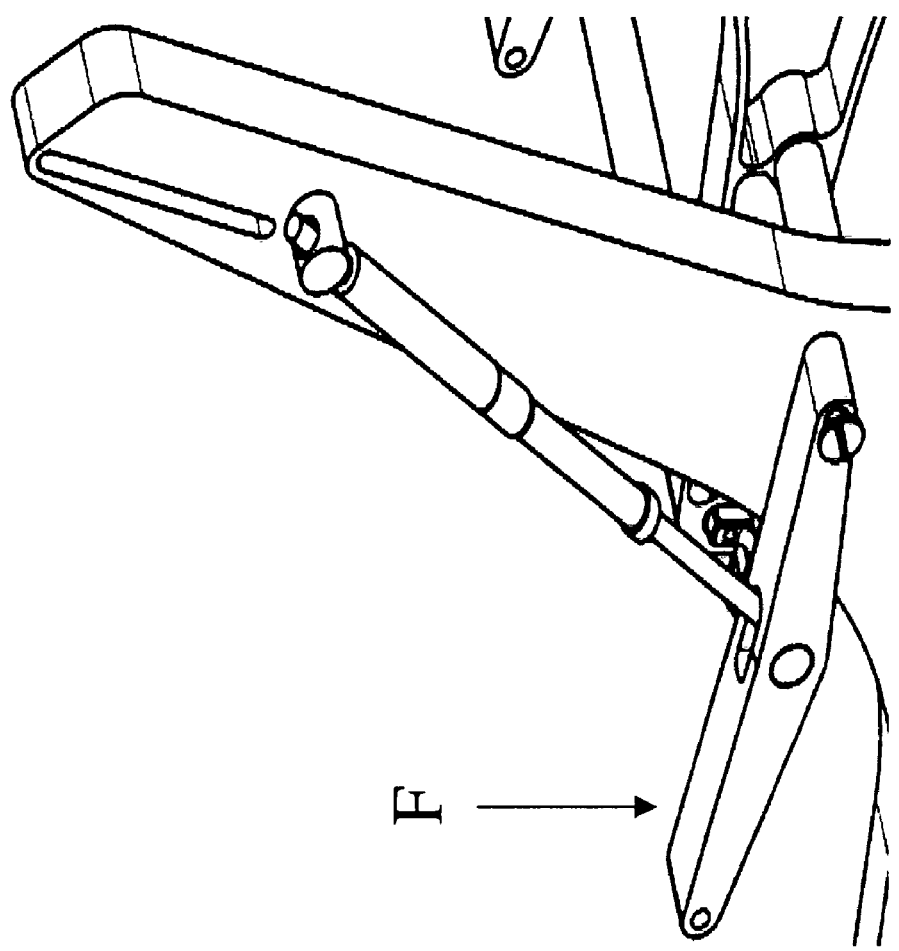
FIG. 5 is a larger-scale view of the supporting structure bearing the bucket seat of the seat according to the invention following a crash.

During an accident, the crash causes a downward force F to be applied to the seat 1, which tends to push the seat downwards into the low position shown in FIG. 4. In this case, the shock absorber 7 permanently absorbs a part of the energy that results from the crash. This shock absorber can therefore be of any suitable type and, for example, absorb the energy by permanent distortion through rotation of the connection between the connecting rod 6 and the structure 5.

This can be carried out in an unlimited manner by plastic deformation of a cylindrical chamber caused by the movement inside the latter of a piston with a larger diameter.

As shown in FIG. 2, the shock absorbers 7 according to the invention are preferably linear.

The characteristics of the shock absorber 7 are adapted to all the population groups that use the seat according to the invention.

According to a specific embodiment of the invention, the shock absorber is a linear shock absorber in the form of a traction system in which the first end 7a is fixed to the supporting structure 5 above the connection point of the connecting rod 6 so as to hold the latter inside its pivot in the event of a downward force being applied.

According to an alternative embodiment, the assembly consisting of the structure 5, bucket seat 2 and shock absorber 7 is prestressed during assembly in order to create a rigid assembly. This is, for example, carried out by means of screw-nut interfaces at the height of at least one of the ends 7a, 7b of the shock absorber, the nuts being tightened until a rigid assembly is obtained.

Figure 6:
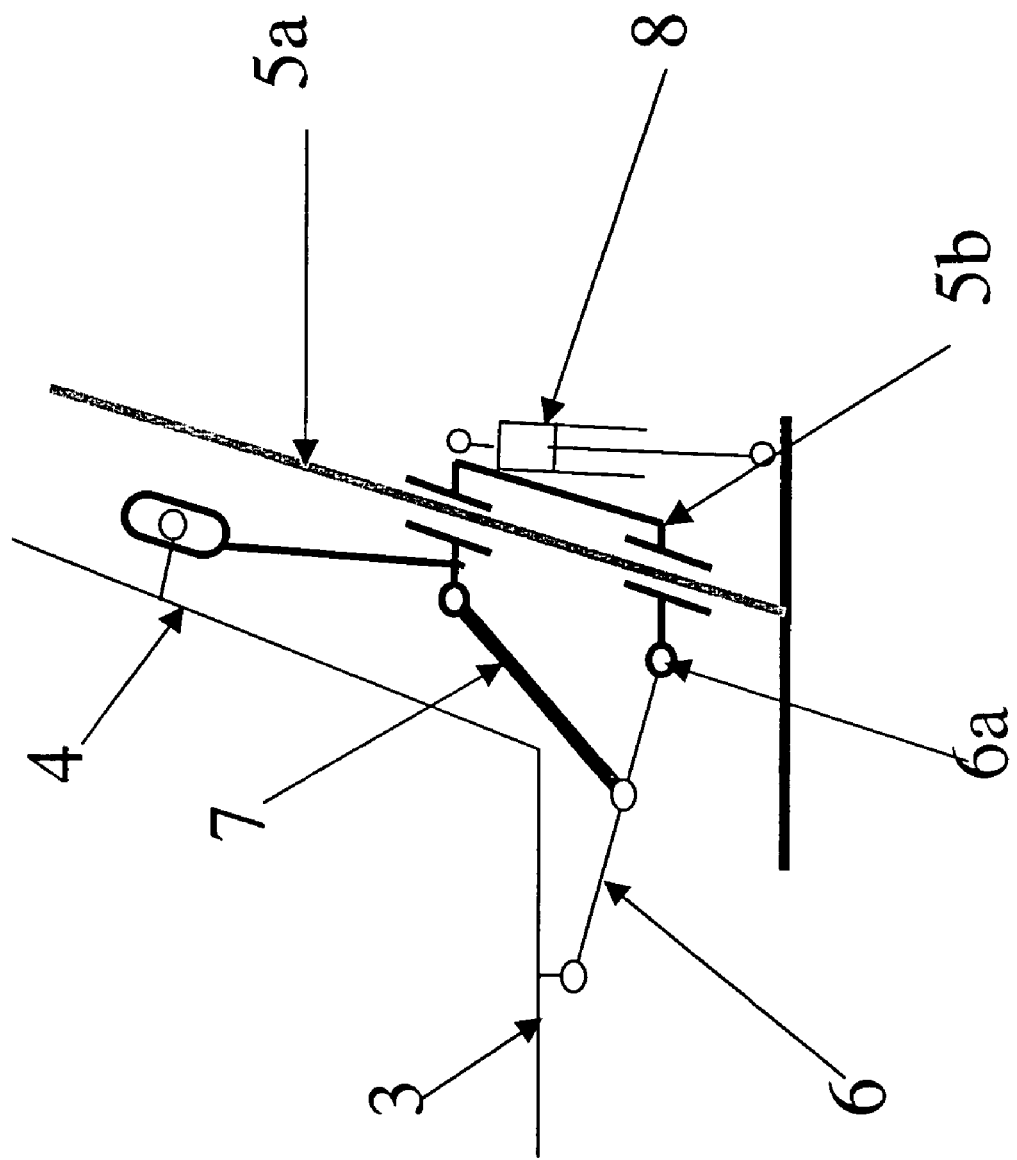
FIG. 6 is a schematic view of the anti-crash seat according to the invention in an embodiment of the invention in which the height of the bucket seat can be adjusted.

According to an embodiment of the invention shown more specifically in a schematic fashion in FIG. 6, the supporting structure 5 comprises a fixed part 5a and a mobile part 5b. The mobile part 5b is installed in an adjustable fashion so as to slide generally vertically on the fixed part 5a and the connecting rod 6 is connected by its first end 6a to the mobile part 5b.

The bucket seat 2 and the mobile part 5b are preferably assembled so as to slide in substantially the same direction so as to ensure that the height of the seat 1 can be adjusted by the unlocking of an adjustment lever.

One or several pushing jacks 8 provide the lifting of the bucket seat 2 when the lever is unlocked. The adjustment is provided either in regular increments, for example by means of a rack and pin system, or continuously by means of hydraulic blocking coupled with the jacks. Vertical adjustment is then carried out as shown in FIG. 7.

During the crash, the adjustment blocker is enough to transmit the vertical stress components to the shock absorbers 7.

This invention makes it possible advantageously to install various types of seatbelt on the seat. According to a first embodiment of the invention, a seatbelt attachment point is placed at the height of the connection between the structure 5 and the connecting rod 6.

Figure 8:
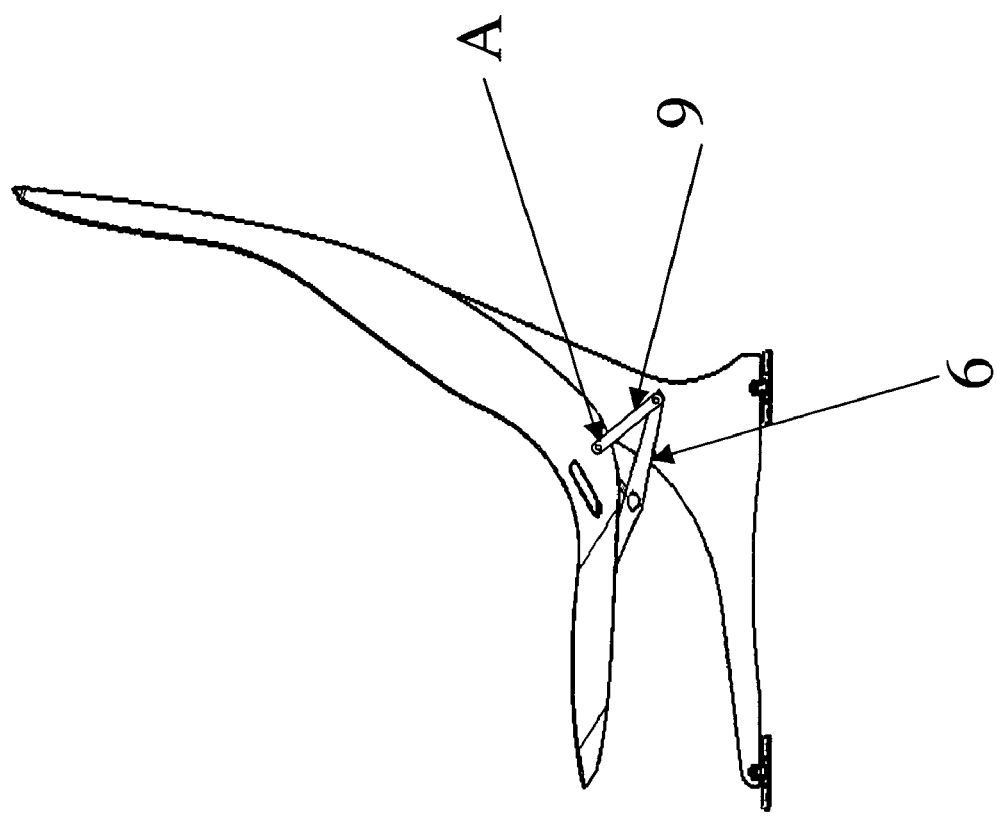
FIG. 8 is a side view of a seat according to the invention in a specific embodiment of the invention.

According to another embodiment of the invention, shown more specifically in FIG. 8, the bucket seat 2 comprises an attachment point A for a seatbelt. This attachment point A is connected by a second connecting rod 9 to the end of the link between the first rod 6 and the supporting structure 5.

This second connecting rod is designed to buckle in the event of a crash, when the system sags.

It is understood that several types of seatbelts can be used in combination with this invention, and particularly lap belts with two attachment points, lap and sash belts with one or two sashes and three or four attachment points and, possibly, an assembly of a lap belt, sash and crotch strap, with five attachment points. In this case, the attachment points can be placed on the bucket seat 2 or on the structure 5.

It is understood that in all these embodiments of the invention, the seat 1 according to the invention can be used in an aircraft, and particularly in a helicopter or an airplane, either as the pilot's seat or as a passenger seat. All kinds of finishes and accessories can also be used in combination with this invention.

The invention claimed is:

1. An aircraft safety seat comprising a supporting structure and a bucket seat supported by said supporting structure, said supporting structure comprises a fixed part and a mobile part, said mobile part being installed in an adjustable fashion so as to slide generally vertically on said fixed part, said bucket seat comprising a seat and a back linked together, said back being installed on said supporting structure so as to slide generally downwards, wherein at least one connecting rod being connected at a first end to said mobile part of said supporting structure and at a second end to said seat, and a shock absorber being coupled to said connecting rod at a connection point on said connecting rod, wherein said connection point is not at either of said first and second ends of said connecting rod, said connecting rod being generally horizontal when in normal use, and being suited for pivoting downwards by its first end under the effect of a force exerted downwards on said seat, against the action of said shock absorber.

2. An aircraft safety seat according to claim 1, in which said shock absorber is a linear absorber in which a first end is fixed to said supporting structure and a second end is fixed to said connecting rod.

3. An aircraft seat according to claim 2, in which said first end of the linear absorber is fixed to said supporting structure above said connection point of said connecting rod.

4. An aircraft safety seat according to claim 1, in which said back is installed so as to slide on said supporting structure by at least one annular linear element.

5. An aircraft safety seat according to claim 1, in which said bucket seat and said mobile part are assembled so as to slide on said fixed part in substantially the same direction.

6. An aircraft safety seat according to claim 1, comprising two lateral connecting rods, each of which is connected to one of the sides of said seat.

7. An aircraft safety seat according to claim 6, comprising an attachment point for a seatbelt on the connection between at least one of said lateral connecting rods and the supporting structure.

8. An aircraft safety seat according to claim 7, further comprising a lap, sash or crotch-strap seatbelt.

9. An aircraft safety seat according to claim 6, comprising an attachment point for a seatbelt on said bucket seat, said attachment point being connected by another connecting rod to the connection between the supporting structure and at least one of said lateral connecting rods, said other connecting rod being designed to deform in the event of a crash.

10. An aircraft safety seat according to claim 1, wherein said connection point is about in the middle of said connecting rod.

* * * * *